United States Patent Office 3,833,718
Patented Sept. 3, 1974

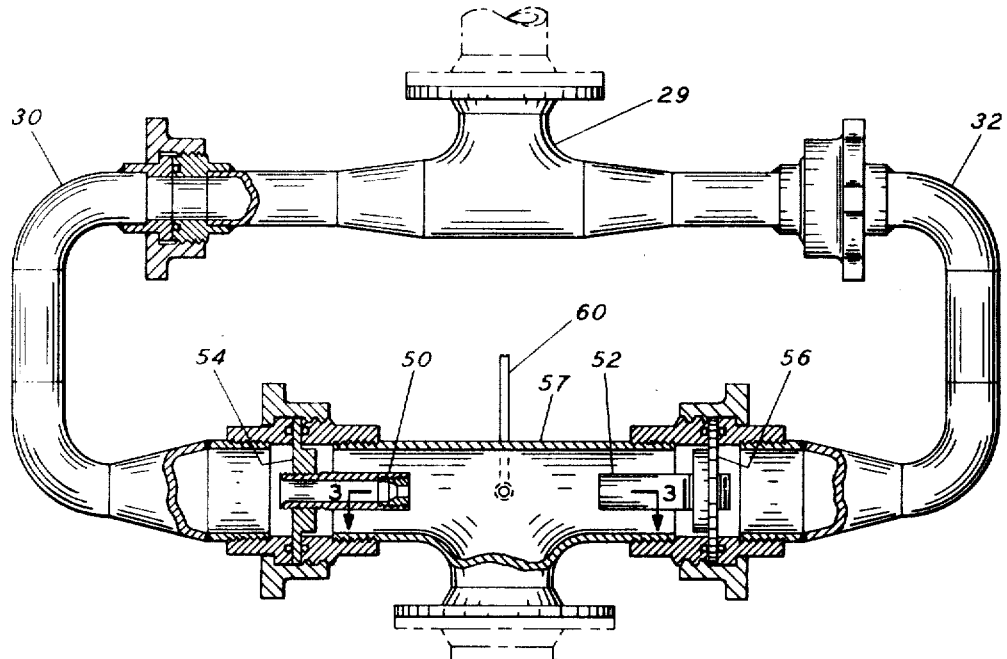
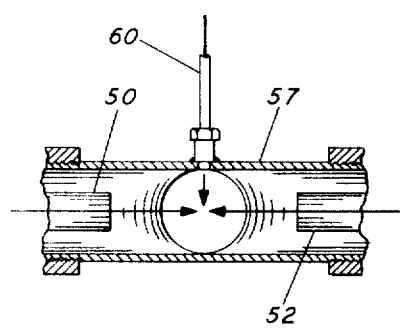
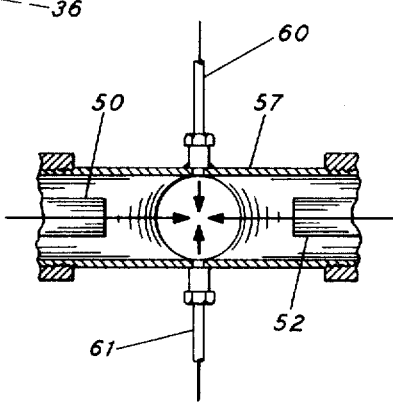
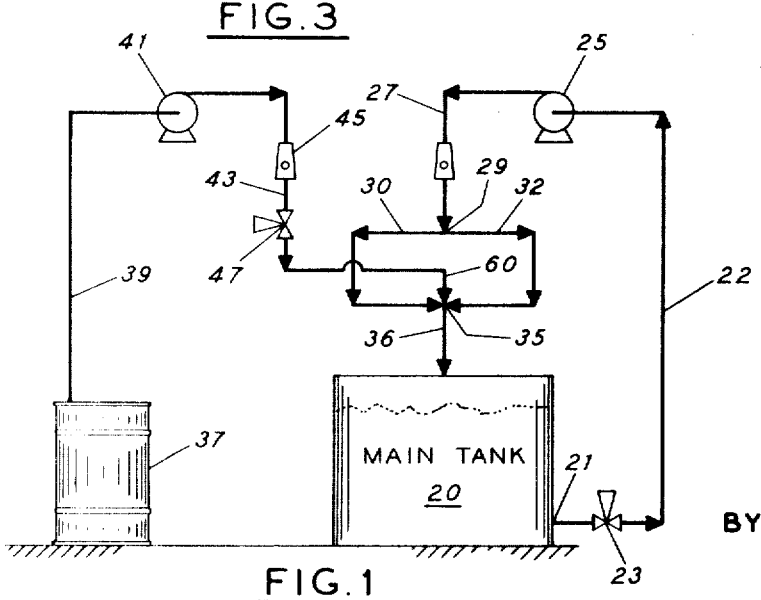
FIG. 2
FIG. 3
FIG. 4
FIG. 1

3,833,718
METHOD OF MIXING AN AQUEOUS ALUMINUM SALT SOLUTION AND AN ALKALINE BASE SOLUTION IN A JET MIXER TO FORM A HYDROXY-ALUMINUM SOLUTION
Marion G. Reed, Hacienda Heights, and Ralph S. Millhone, Brea, Calif., assignors to Chevron Research Company, San Francisco, Calif.
Continuation of abandoned application Ser. No. 130,689, Apr. 2, 1971. This application July 2, 1973, Ser. No. 376,024
Int. Cl. C01f 7/02
U.S. Cl. 423—629
6 Claims

ABSTRACT OF THE DISCLOSURE

Method and apparatus for high shear mixing particularly useful in preparing hydroxy-aluminum solution for use in well treating.

RELATED APPLICATIONS

This is a continuation of application Ser. No. 130,689, now abandoned, filed Apr. 2, 1971.

This application is related to copending application Ser. No. 875,026, filed Nov. 10, 1969 for Formation Permeability Maintenance With Hydroxy-Aluminum Solutions, the contents of which are incorporated herein by reference.

BACKGROUND OF THE INVENTION

This invention relates to a method and apparatus for use in high shear mixing of fluids such as in the preparation of hydroxy-aluminum solutions for well treating and, more particularly, the invention relates to mixing hydroxy-aluminum well treating solution by forming a high shear zone at the confluence of opposing streams of an aluminum salt solution and injecting into such high shear zone a stream of an alkali or alkaline base.

Many types of fluid mixes require that the fluids be mixed in a zine of high shear. For example, as set out in copending application Ser. No. 875,026, a hydroxy-aluminum well treating solution must be prepared by mixing the components in a zone of high shear. The aforesaid hydroxy-aluminum solution is formed by adding to water a quantity of aluminum salts selected from the group consisting of aluminum chloride, aluminum bromide, aluminum iodide, aluminum nitrate, aluminum sulfate and aluminum acetate in an amount of between 0.01 and 24.0 pounds of aluminum per barrel of water to form an aluminum salt solution. An alkali or alkaline base in an amount of between 0.95 and 1.7 pounds of hydroxide ion for each pound of aluminum is then added to such salt solution to form a hydroxy-aluminum solution. The preparation of such hydroxy-aluminum solution has heretofore been relatively difficult since the mixing of the aluminum salt solution and the alkali or alkaline base had to proceed under controlled conditions in a container being vigorously stirred in order to prevent formation of an undesirable precipitate. The method and apparatus of the present invention is useful to provide hydroxy-aluminum solutions for use in well treatment.

BRIEF DESCRIPTION OF THE INVENTION

The present invention provides apparatus for jet mixing two or more fluids by providing means for directing opposing fluid streams to meet in a mixing zone and a means for jetting streams of one or more other fluids into the confluence of the first fluid streams in the center of the mixing zone to thoroughly mix all streams under high shear conditions.

The apparatus is particularly useful in a method of preparing a hydroxy-aluminum solution for use in a well. Two opposing streams of an aluminum salt solution are jetted together to form a high shear mixing zone at the confluence of the opposing streams. A stream of an alkali or base solution is jetted into the mixing zone at an angle to the converging streams of aluminum salt solution. These streams meet to form a hydroxy-aluminum solution. This hydroxy-aluminum solution is removed from the mixing zone and is used in well treating.

OBJECTS OF THE INVENTION

It is a particular object of the invention to provide a mthod and apparatus for mixing streams under high shear conditions. Further objects and advantages of the present invention will become apparent from reading the following detailed description in view of the accompanying drawing which is made a part of this specification.

BRIEF DESCRIPTION OF THE DRAWING

FIG. 1 is a schematic illustration of the preferred form of apparatus assembled in accordance with the present invention. FIG. 2 is an elevation view, with portions broken away for clarity of presentation, showing in more detail the preferred mixing zone of the present invention. FIG. 3 is a sectional view taken at line 3—3 of FIG. 2. FIG. 4 illustrates an alternative mixing zone assembled in accordance with the present invention.

DETAILED DESCRIPTION OF THE INVENTION

FIG. 1 illustrates in schematic form the preferred arrangement of apparatus useful in the practice of the present invention. A main tank 20 is used to hold a first fluid such as an aluminum solution initially and the mixed solution as it is being prepared. A tap 21 is formed in the lower portion of the tank 20 and a flow line 22 is connected through a suitable valve 23 to the tank. The flow line 22 leads to a high volume, high-pressure fluid pump 25. A high-pressure flow line 27 leads from the pump 25 to a T 29 where the flow line divides into a pair of branch lines 30 and 32. The branch lines divide and direct the flow of the solution into an opposing converging path as illustrated by the arrows converging at point 35. The resulting confluence of the two streams produces a zone of high shear into which a second fluid such as an alkali or alkaline base is injected.

Thus, a source 37 of a suitable second fluid such as an alkali or alkaline base solution is provided with a suitable flow line 39 to connect such a source with a fluid pump 41. The downstream exit of the pump 41 is connected by flow line 43 through a suitable meter 45 and valve 47 to the mixing zone 35. The second fluid is injected into the high-pressure mixing zone at right angles to the opposing streams of the first fluid.

FIG. 2 is an elevation view, with portions broken away for clarity of presentation, of the apparatus useful in forming the mixing zone of the present invention. The first fluid from the mixing tank is divided into two streams at T 29. Suitable connecting pipes 30 and 32 direct the streams of first fluid to a pair of spaced apart opposing jets 50 and 52. These jets are held in place in the pipes 30, 32 by suitable baffle plates 54 and 56. Thus all flow through pipes 30 and 32 into the mixing zone formed by conduit 57 is through the opposing jets 50 and 52. The flow through these jets is along a common center line and the jets meet in the center of the mixing zone under high shear conditions.

A second fluid is directed into the mixing zone inside conduit 57 by means of line 60. Generally this line is used to carry a lesser amount of fluid than the fluid jetted together in the opposing streams. As illustrated in FIG. 3 line 60 is preferably teed into conduit 57 to provide for jetting the second fluid into the center of the converging first fluid streams and at right angles to such streams. This manner of meeting gives a high shear mix to the fluids. If desired, one or more additional fluids or multiple streams of a second fluid can be mixed. As illustrated in FIG. 4, a second auxiliary line 51 may be teed into the conduit 57 forming the mixing zone. This second auxiliary line 61 is located in opposing relationship to the first auxiliary line 60 and also directs flow into the center of confluence of the opposing streams form jets 50 and 52.

In practicing the method of the present invention a hydroxy-aluminum solution is prepared by bringing together solutions of an aluminum salt and an alkali or alkaline base in a high shear zone. In the preferred form the hydroxy-aluminum (OH-Al) sodium is prepared in a high shear mixer by proportioned mixing of solutions of aluminum chloride ($AlCl_3$) and sodium hydroxide (NaOH). The OH-Al solution may be prepared in any concentration below its saturation value; however, a 20× concentrate containing about 97 lb./bbl. $AlCl_3$ (275 gm./liter) is the most practical. Commercially available 32.2 Bé. $AlCl_3$ solution (28.1% by wt.) and 49.5 Bé. NaOH solution (50% by wt.) are recommended reagents. The extract quantities of these reagents will depend on their concentration, purity and desired OH/Al ratio of the product. If a product with an OH/Al ratio of 2.0 is desired, the ratio of actual $AlCl_3$ to actual NaOH must be 1.66 (lbs. $AlCl_3$/lgs. NaOH).

Knowledge of chemical purity is important in obtaining a correct OH-Al solution. A chemical analysis of each lot of $AlCl_3$ and NaOH will be required. Adequate acid-base analyses are obtained by titration to phenolphthalein end point, using standard-NaOH with the $AlCl_3$ and standard-HCl with the NaOH. For the $AlCl_3$, an aluminum analysis by atomic absorption spectrometry, or any other convenient means, is also required.

The concentration factors $C_{OH}$ and $C_{Al}$ can be determined from solution density correlations and the appropriate chemical analyses.

Mixing Volumes:

$$V_{OH} = V_T/(1+r)$$

$$V_{Al} = V_T - V_{OH}$$

where:

$V_T$ = volume of 20× OH-Al solution desired
$V_{OH}$ = volume of NaOH solution needed
$V_{Al}$ = volume of $AlCl_3$ solution needed
$r$ = volumetric ratio of available $AlCl_3$/NaOH solutions which give an $AlCl_3$/NaOH compound ratio of 1.66.

A typical mixture example is set out below.

50 bbl. of 20× OH-Al with OH/Al ratio of 2.0 made from purchased 47.0% (wt.) NaOH solution that is 97% pure (by analysis) and 30.1% (wt.) $AlCl_3$ solution of 88% purity (based on aluminum content).

$C_{OH}$ = 47.0 × 0.97 = 45.5 lb. NaOH/100 lb. NaOH solution $C_{Al}$ = 30.1 × 0.88 = 26.5 lb. $AlCl_3$/100 lb. $AlCl_3$ solution $$r = 1.98 \ (45.5/26.5) = 3.40 \ \frac{\text{bbl. } AlCl_3 \text{ solution}}{\text{bbl. NaOH solution}}$$

$V_{OH}$ = 50/(1+3.40) = 11.4 bbl. NaOH solution
$V_{Al}$ = 50 − 11.4 = 38.6 bbl. $AlCl_3$ solution The chemicals will form a precipitate of $Al(OH)_3$ if NaOH is added too rapidly or if it is not added to the $AlCl_3$ at a point of very high shear mixing. The jet-type mixer of the present invention has been successfully used to prepare OH-Al solutions.

Aluminum chloride is placed in a tank 20 large enough to hold the final volume of OH-Al solution. Flow lines 22, 27, 30, 32 and 36 connecting the tank, a high pressure-large volume pump 25 and the jet-mixing zone 35 are installed so that the solution in the tank can be circulated through the mixing zone 35, and back to the tank 20. Jet nozzles 50, 52 in the mixer should be sized so that a 200-600 p.s.i. pressure drop occurs across them when the tank fluid is being circulated at the desired flow rate. The jet nozzles should be spaced no further apart than ten times their diameter. The NaOH is added to the circulating $AlCl_3$ solution via a small tube that empties at the point of impingement of the opposing jet streams. A chemical pump capable of a constant rate of 1/60 to 1/200 of the $AlCl_3$ circulation rate is used to inject the NaOH.

The $AlCl_3$ circulation pump is run at a constant and known rate. The chemical pump is then started to inject NaOH at the proper rate relative to the $AlCl_3$ circulation. The fluid in the mix tank should be "turned" once after the NaOH has been added. All flow line connections should be tight enough to prevent fluid leaks or aspiration of air into the pump or mixer during the mixing.

As an example of mixing procedure and time, if 50 bbl. of 20× OH-Al are to be prepared from the chemicals noted above, using a 10 bbl./min. $AlCl_3$ circulation rate ($\Delta P_{jet}$ = 400 p.s.i.) and a 0.1 bbl./min. NaOH addition rate, it will require 1 hr. 54 mins. to add the NaOH and 5 mins. to turn the OH-Al solution. Mixing time can be reduced by proportional increases in the $AlCl_3$ circulation and NaOH addition rates or by reducing the $AlCl_3$:NaOH flow rate ratio from the normal 100:1 to a minimum of 50:1.

A properly prepared OH-Al solution will not precipitate $Al(OH)_3$. The solution is very stable and will not undergo degradation. The best indication of successful preparation is obtained by diluting a sample of 20× OH-Al with 19 volumes of clear, fresh water. The resulting solution should be clear, water white in appearance and should have a pH between 3.9 and 4.2. If the diluted OH-Al solution is not clear, wait an hour or so, dilute a second sample of 20× OH-Al and check for clarity and pH. An OH-Al solution cannot be used if it is unclear when diluted.

If the pH is not correct then an error occurred in the proportions of $AlCl_3$ and NaOH used. This may be the result of either poor chemical analysis or improper control of the volume of chemicals used. If the jet spacing is too wide, the jet pressure-drop too low, or the AlCl:NaOH flow rate ratio too low, the OH-Al solution may have marginal clarity. If clarification does not occur in a few hours, it may never occur.

Both $AlCl_3$ and OH-Al solutions are acidic and somewhat corrosive. Their corrosiveness is approximately equal to that of HCl of the same molarity. Corrosion can be controlled by inhibitor; Dowell A–110 and Byron Jackson C–12 have both been successfully tested. Any inhibitor with a pH higher than 5 must be adjusted with HCl to pH4 before being added to the OH-Al; otherwise $Al(OH)_3$ may precipitate.

A number of demonstrations were conducted to show the efficiency of the above described method of mixing hydroxy-aluminum mixtures with the apparatus of the present invention. The results of these demonstrations are set out below in Table I.

TABLE I

| Data | Run 1 | Run 2 | Run 3 | Run 4 |
|---|---|---|---|---|
| Total system water, liters | 160 | 180 | 80 | 0. |
| Pressure, p.s.i. upstream of jets | 600 | 200 | 600 | 600 to 400. |
| Time to pump 20 liters, sec | 30.04 | 55.17 | 31.28 | 32.0 to 20. |
| Flow rate, liters/sec. ($AlCl_3$) | .667 | .362 | .639 | ~.77. |
| Liters of $AlCl_3$ | 6.14 | 6.14 | 61.4 | 32.3. |
| Liters of NaOH | 1.67 | 1.67 | 16.72 | 8.8. |
| Chemical pump settings | 40 | 26 | 30 | 27 to 50. |
| Flow rate, liters/sec. (NaOH) | .00277 | .00175 | .00152 | .00151. |
| Time for solution to clarify, min | 45 | 68 | 0 | 0. |
| pH of final solution | 4.10 | 4.08 | 3.02 | 2.54. |
| Concentration of Na in final solution by atomic absorption, p.p.m. | 5,800 | 5,000 | 48,000 | 73,000. |
| Concentration of Al in final solution by atomic absorption, p.p.m. | 2,300 | 2,120 | 23,400 | 51,500. |
| Did precipitate form in final solution, No or Yes | No | No | No | No. |
| Temperature of final solution, °C | 34 | 34 | 66 | 74½. |
| Time to pump 100 ml. of NaOH, sec | 36.06 | 57.18 | 65.88 | 66.42. |
| Injection rate, flow rate $AlCl_3$/flow rate NaOH | 240.8:1 | 206.8:1 | 420.4:1 | 509.9:1. |

Although the present method has been described in detail as relating to preforming a hydroxy-aluminum solution for well treating, it can be seen that the invention is applicable to forming other types of mixtures where high energy mixing of two or more fluids is desired. For example, many emulsions and foams may be prepared in accordance with the present invention. Other areas where the present invention finds use in mixing include catalyst preparation, resin pigmentation and microencapsulation.

SUMMARY

The present invention provides a method and apparatus for mixing fluids under high shear high energy conditions. Although certain preferred embodiments of the invention have been described in detail the invention is not meant to be limited to only these embodiments but rather by the scope of the appended claims.

We claim:

1. A method of preparing a hydroxy-aluminum solution for use in a well comprising the steps of jetting two opposing streams of an aluminum salt solution together in a mixing zone to form a higher shear zone at the confluence of the merging streams, directing a stream of an alkali or alkaline base solution into said mixing zone into the high shear zone from a location substantially at right angles to said merging streams of aluminum salt solution to react to form a hydroxy-aluminum solution and removing said hydroxy-aluminum solution from said mixing zone.

2. A method of preparing a hydroxy-aluminum solution for use in a well comprising the steps of jetting two opposing streams of an aluminum chloride solution together in a mixing zone to form a high shear zone at the confluence of the merging streams, directing a stream of sodium hydroxide solution into said mixing zone into the high shear zone from a location substantially at right angles to said merging streams of aluminum chloride to react to form a hydroxy-aluminum solution and removing said hydroxy-aluminum solution from said mixing zone.

3. The method of Claim 2 where the jets of aluminum chloride solution are developed through orifices and that the pressure drops across the orifices are maintained between 200 and 600 p.s.i.

4. The method of Claim 3 where the flow ratios of aluminum chloride to sodium hydroxide are maintained between 50:1 and 500:1.

5. The method of Claim 3 where the longitudinal distance between the orifices is from 5 to 10 diameters.

6. The method of Claim 1 where the aluminum salt solution is formed to an aluminum salt selected from the group consisting of aluminum chloride, aluminum bromide, aluminum iodide, aluminum nitrate, aluminum sulfate and aluminum acetate and the base solution is formed of sodium hydroxide.

References Cited

UNITED STATES PATENTS

| 3,603,399 | 9/1871 | Reed | 166—305 R |
| 1,496,858 | 6/1924 | Knollenberg | 252—314 |
| 2,684,949 | 7/1954 | McMillian et al. | 252—314 |
| 2,127,026 | 8/1938 | Grindrod | 252—314 |
| 3,061,544 | 10/1962 | Martinek | 252—314 |

CARL D. QUARFORTH, Primary Examiner

B. HUNT, Assistant Examiner

U.S. Cl. X.R.

166—305 R, 292; 252—8.55 R. 314; 259—4; 423—625

UNITED STATES PATENT OFFICE

CERTIFICATE OF CORRECTION

Patent No. 3,833,718      Dated September 3, 1974

Inventor(s) MARION G. REED and RALPH S. MILLHONE

It is certified that error appears in the above-identified patent and that said Letters Patent are hereby corrected as shown below:

Col. 1, line 42, "zine" should read --zone--.

line 53, "alkaline base" should read --alkaline earth base--.

line 59, "alkaline base" should read --alkaline earth base--.

Col. 2, line 14, "base solution" should read --alkaline earth base solution--.

line 20, "of the invention" should read --of the present invention--.

line 22, "mthod" should read --method--.

line 22, "streams" should read --fluid streams--.

line 54, "alkaline base" should read --alkaline earth base--.

Col. 3, line 21, "line 51" should read --line 61--.

line 29, "alkaline base" should read --alkaline earth base--.

line 30, "sodium" should read --solution--.

line 43, "$AlCl_3$/lgs." should read --$AlCl_3$/lbs.--.

line 66, "mixture" should read --mixing--.

Col. 5, (Table I), line 5, "32.3" should read --32.2--.

PO-1050 (5/69)

UNITED STATES PATENT OFFICE
CERTIFICATE OF CORRECTION

Page 2

Patent No. 3,833,718      Dated September 3, 1974

Inventor(s) MARION G. REED and RALPH S. MILLHONE

It is certified that error appears in the above-identified patent and that said Letters Patent are hereby corrected as shown below:

Col. 5, line 39, "a hydroxy-aluminum" should read --an aqueous hydroxy-aluminum--.

line 41, "an aluminum" should read --an aqueous aluminum--.

line 42, "higher" should read --high--.

line 45, "alkali or alkaline base" should read --aqueous alkali or alkaline earth base--.

line 48, "a hydroxy-aluminum" should read --an aqueous hydroxy-aluminum--.

line 51, "a hydroxy-aluminum" should read --an aqueous hydroxy-aluminum--.

line 53, "an aluminum chloride" should read --an aqueous aluminum chloride--.

line 56, "sodium hydroxide" should read --aqueous sodium hydroxide--.

Col. 6, line 23, "a hydroxy-aluminum" should read --an aqueous hydroxy-aluminum--.

line 36, "formed to an" should read --formed of an--.

Signed and sealed this 18th day of March 1975.

(SEAL)
Attest:

RUTH C. MASON
Attesting Officer

C. MARSHALL DANN
Commissioner of Patents
and Trademarks